G. I. WASHBURN.
Drill Stock.

No. 24,894. Patented July 26, 1859.

Witnesses
F. Millard
I. B. Root

Inventor
Geo. I. Washburn

UNITED STATES PATENT OFFICE.

GEORGE I. WASHBURN, OF WORCESTER, MASSACHUSETTS.

BORING-TOOL.

Specification of Letters Patent No. 24,894, dated July 26, 1859.

*To all whom it may concern:*

Be it known that I, GEORGE I. WASHBURN, of Worcester, in the county of Worcester and State of Massachusetts, have invented certain new and useful Improvements in the Stocks or Shafts of Boring and other Tools; and I do hereby declare that the following is a full, clear, and exact description of the construction and operation of the same, reference being had to the accompanying drawings, in which—

Figure 4:
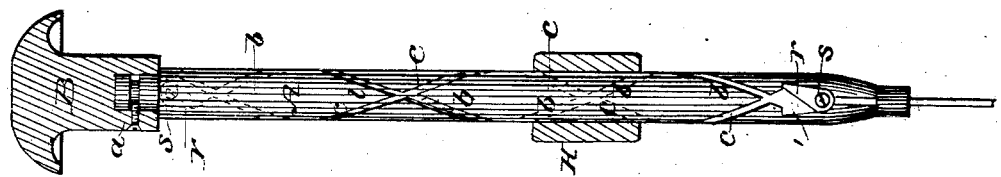
Figure 5:
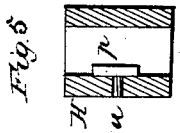
Figure 6:
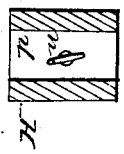
Figure 3:
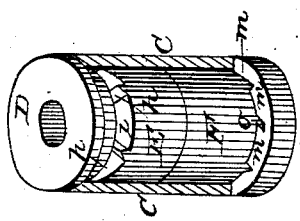
Figure 3:
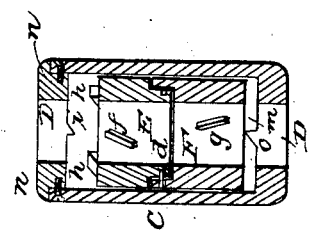
Figure 1:
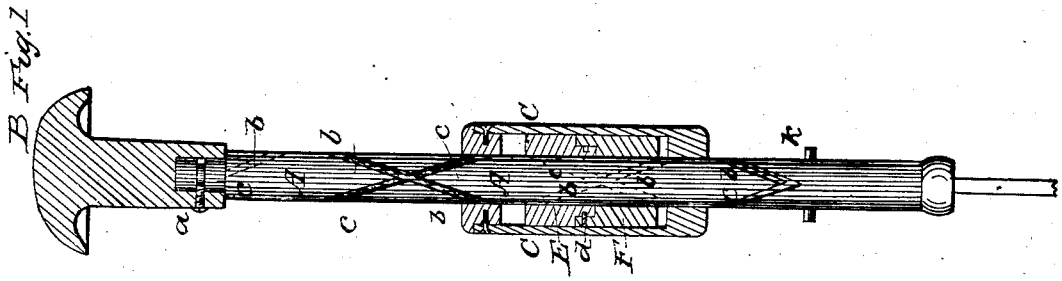

Figure 1, represents a side view of the shaft of a boring tool. Fig. 2, represents a perspective in section of the nut or sleeve by which the stock is operated. Fig. 3, represents a vertical central section through said nut. Fig. 4, represents a side view of the stock of a boring tool with a modified arrangement for operating said shaft. Figs. 5 and 6, represent vertical central sections through the nut or sleeve by which the stock in Fig. 4, is operated.

I am aware that the stocks of boring tools, as in McDowell's Archimedean boring tool, and others, have been operated so as to turn in a continuous rotary direction by a fly wheel and ratchets and in an intermittent, as well as in a reciprocating rotary direction, by the action of a sliding nut which moved in a rectilinear direction on said shaft; by some of these arrangements the boring tool itself had to be made so as to cut in two different directions, and could not be made with a cutting edge, such as is used most effectually in boring tools, which move in one and the same direction, while for a screw driver, for which I contemplate also the application of my invention, such an arrangement would be impracticable. I do not therefore lay any claim to such reciprocating, intermittent, or continuous rotary motions.

The nature of my invention consists in imparting to the stock of a boring or other tool a continuous rotary motion in one and the same direction by giving to a sleeve or nut on said tool stock a rectilinear reciprocating motion.

To enable others skilled in the art to make and use my invention, I will proceed to describe its construction and operation.

A, represents the stock of a boring tool; it can turn freely within the shank of the handle or butt B, and is held therein by the pin $a$, passing into a groove of the tool stock. The cylindrical stock A, has cut on its circumference two spiral grooves $b$, and $c$, which run in opposite directions.

C, is a cylindrical nut or sleeve, which consists of a casing, the thick ends of which serve as the bearings for said sleeve to run on the shaft A, the holes D, having the same diameter as said shaft.

E, and F, are two sleeves which also fit on the shaft A, so as to have free play on the same, but which are inclosed within the nut C; they are coupled together by means of a pin $d$, which runs within a groove of the sleeve E, so that both sleeves can turn independently of each other but are held together from being separated. $f$, and $g$, are tongues or projections which are respectively formed on the inner peripheries of the sleeves E, and F, and the positions of which are such as to correspond respectively with the inclinations of grooves $c$, and $b$. $i$, and $o$, are projections on the inner sides of the end pieces of the nut C, and $h$, and $m$, are similar projections on the ends of the sleeves E, and F, standing in opposite directions to the former.

When the parts of this implement are put together, the projection $f$, of the sleeve E, will be in the groove $c$, of the shaft A, and the projection $g$, of the sleeve F, in the groove $b$. By moving the nut C, on the shaft A, upward, the projection $m$, will come in contact with the projection $o$, thus coupling the sleeves F, and C, together, while the sleeve E, can turn freely on the sleeve F; by moving the nut C, farther upward the tongue $g$, will bear on the side of the spiral groove $b$, and will thus cause the shaft A, to revolve. When the sleeve C, strikes the end of the shank B, its course is arrested, and on being moved down, (the sleeves F, and E, remaining stationary), the former is uncoupled from the sleeve C, while the sleeve E, is coupled to the same by the teeth $h$, and $i$, coming in contact, and as the movement of the nut C, is now in an opposite direction to its former movement, and as the groove $c$, which is now operated upon by the tongue $f$, runs also in an opposite direction to the groove $b$, it follows that the shaft A, is revolved in the same direction as before, and the result is a continuous rotary motion in one and the same direction. If it is desired to change the direction of the motion, then the sleeves E, and F, can be taken out of the nut C, by unscrewing the screws $n$, and removing the end of said nut, and they can then be inserted again in a reversed position, and when used in this way the motion of the shaft will be reversed. The motions of the nut C, are limited by the shank of the handle B, and by the projecting pin k.

A modification of the above described arrangement is represented in Fig. 4. The grooves c, and b, are the same as those represented in Fig. 1, but with the difference that their ends are open and lead to the guide pieces or switches r, which are pivoted or secured to the stock by means of the screws s; H, is the sliding nut of the stock to the inner side of which is secured a tongue p, by means of a swivel pin u, which can turn in its socket, when the nut H, is operated, the tongue p, plays alternately within the grooves c, and b, and it is directed from one groove into the other by striking one of the guide pieces or switches r, at the ends of its course, and by thus being turned to such a position as will correspond to the groove into which it is to slide, it will then work on the same principle as described above that is by a continuous rotary motion in one and the same direction. The direction of the rotation of the shaft can, however, if desirable be changed by moving one of the guide pieces r, until it touches and rests against the side l, of its recess, and then the stock or tool will have a reciprocating, instead of a continuous rotary motion. Thus by this construction, either motion may be had at pleasure,—but I deem the fact that I cause the tool to always rotate in the same continued direction by means of a sliding nut alone without any other device as the leading characteristic of my invention, whether the switches or guides r, r, be used or not, their use being incidental, not obligatory.

Having thus fully described the nature of my invention, what I claim therein as new, and desire to secure by Letters Patent is—

Giving the stock or shaft of a boring, screw-driving, or other tool, a continuous rotary motion in one and the same direction by means of a nut or sleeve which is moved in a rectilinear reciprocating direction on said shaft, when constructed and arranged substantially in the manner herein described.

GEO. I. WASHBURN.

Witnesses:
F. WILLARD,
J. B. ROOT.